(12) United States Patent
Patel et al.

(10) Patent No.: US 12,093,181 B2
(45) Date of Patent: Sep. 17, 2024

(54) ALLOCATION CONTROL FOR CACHE

(71) Applicant: Advanced Micro Devices, Inc., Santa Clara, CA (US)

(72) Inventors: Chintan S. Patel, Santa Clara, CA (US); Alexander J. Branover, Boxborough, MA (US); Benjamin Tsien, Santa Clara, CA (US); Edgar Munoz, Austin, TX (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/852,296

(22) Filed: Jun. 28, 2022

(65) Prior Publication Data
US 2023/0418753 A1    Dec. 28, 2023

(51) Int. Cl.
*G06F 12/08* (2016.01)
*G06F 12/0811* (2016.01)
*G06F 12/0864* (2016.01)
*G06F 12/0871* (2016.01)

(52) U.S. Cl.
CPC ...... *G06F 12/0871* (2013.01); *G06F 12/0811* (2013.01); *G06F 12/0864* (2013.01)

(58) Field of Classification Search
CPC ............ G06F 12/0871; G06F 12/0811; G06F 12/0864; G06F 12/1483; G06F 2212/1021; G06F 2212/1024; G06F 12/084; G06F 12/0857; G06F 2212/502
USPC ..................................................... 711/122
See application file for complete search history.

(56) References Cited

U.S. PATENT DOCUMENTS

| | | | |
|---|---|---|---|
| 9,298,616 B2 * | 3/2016 | Soundararajan .... | G06F 12/0802 |
| 10,303,602 B2 | 5/2019 | Kayiran et al. | |
| 2007/0180199 A1 | 8/2007 | Augsburg et al. | |
| 2013/0151777 A1 | 6/2013 | Daly et al. | |
| 2017/0255569 A1 * | 9/2017 | Sartorius ............. | G06F 12/0811 |
| 2017/0293565 A1 | 10/2017 | Priyadarshi et al. | |
| 2018/0260330 A1 * | 9/2018 | Felter .................. | G06F 9/5016 |
| 2020/0151111 A1 | 5/2020 | Krueger | |

* cited by examiner

*Primary Examiner* — Hua J Song
(74) *Attorney, Agent, or Firm* — Volpe Koenig

(57) ABSTRACT

A technique for operating a cache is disclosed. The technique includes based on a workload change, identifying a first allocation permissions policy; operating the cache according to the first allocation permissions policy; based on set sampling, identifying a second allocation permissions policy; and operating the cache according to the second allocation permissions policy.

20 Claims, 3 Drawing Sheets

ALLOCATION CONTROL FOR CACHE

BACKGROUND

Caches improve performance by storing copies of data considered likely to be accessed again in the future into a low latency cache memory. Improvements to cache technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for operating a cache is disclosed. The technique includes based on a workload change, identifying a first allocation permissions policy; operating the cache according to the first allocation permissions policy; based on set sampling, identifying a second allocation permissions policy; and operating the cache according to the second allocation permissions policy.

Figure 1:
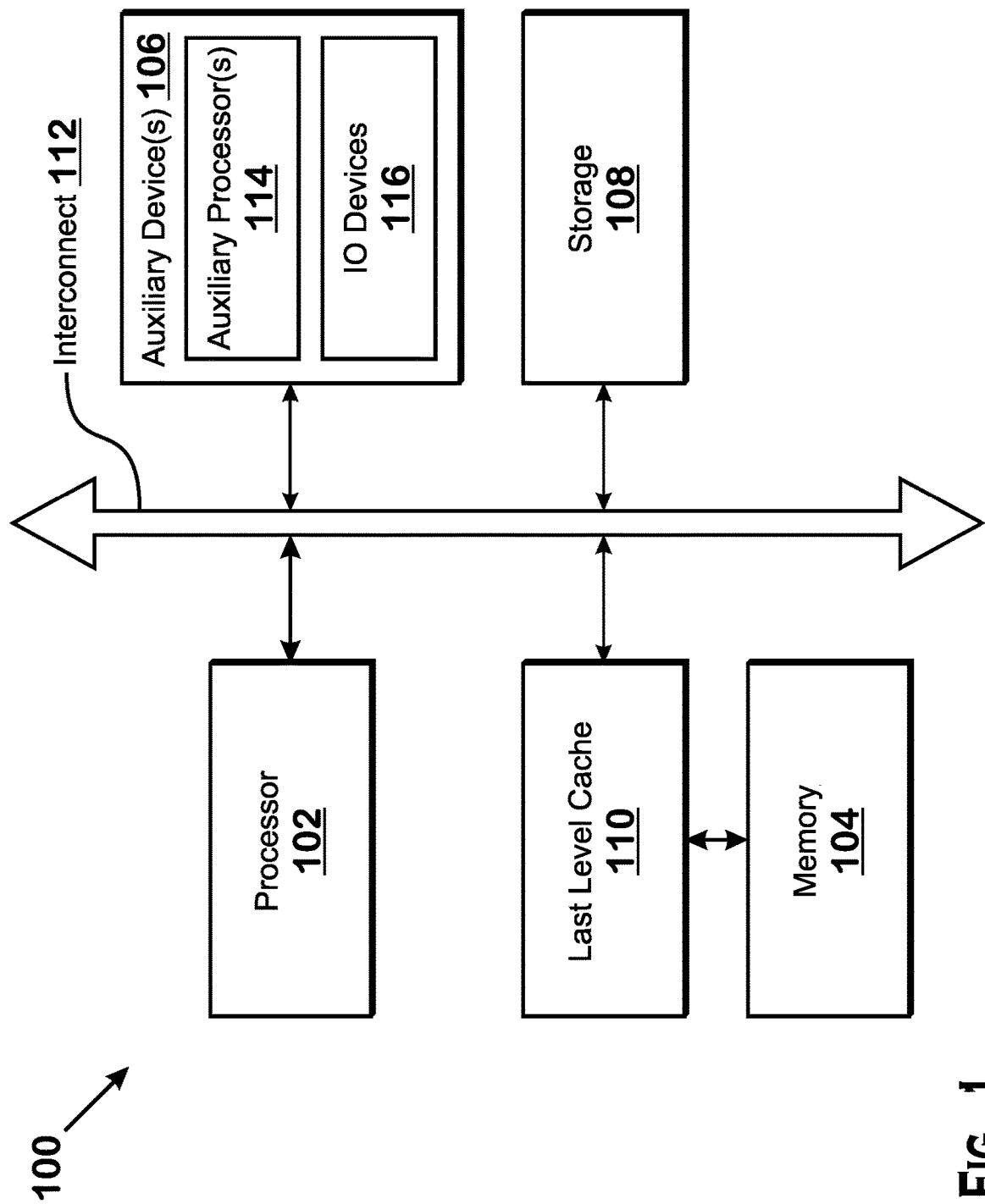
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102 and the various auxiliary devices 106. In some implementations, there other caches within the device 100. For example, in some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches.

In some examples, the last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104. Although techniques are described herein for operations involving the last level cache 100, it should be understood that the techniques can alternatively be used in other types of caches or memories.

Figure 2:
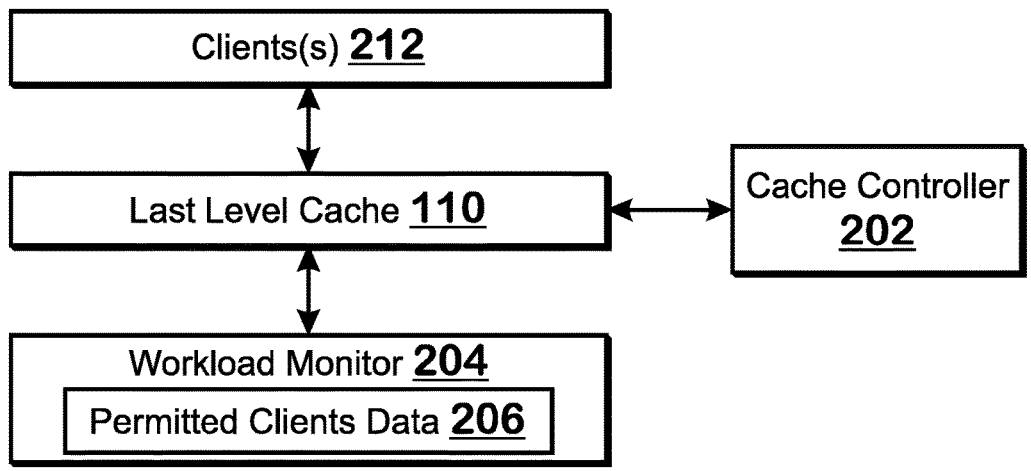
FIG. 2 illustrates elements of the device associated with the last level cache, according to an example.

FIG. 2 illustrates elements of the device 100 associated with the last level cache 110, according to an example. The elements include the last level cache 110, clients 212, a cache controller 202, and a workload monitor 204.

The last level cache 110 is shared between many clients 212 of the device 100. As used herein, the term "client" refers to any element that requests access to the last level cache 110, such as elements of the device 100. In various examples, clients 212 include one or more software elements (e.g., the operating system, a driver, an application, thread, process, or firmware) executing on a processor such as the processor 102, one or more hardware elements, such as the processor 102 or an auxiliary device 106, or a combination of software and hardware.

The last level cache 110 has a limited size. With more contention for the last level cache 110, cache thrashing may occur, leading to reduced performance for the clients 212. Thus, in some situations, it is beneficial to allow certain types of clients 212, but not other types of clients 212, to allocate entries into the cache 110. An allocation occurs in response to a miss for a client 212. Specifically, in some situations, when a memory access request for a client 212 does not hit in the cache 110, the cache 110 allocates an entry in the cache 110, fetches the data targeted by the memory access request from the memory 104, and places that data into the allocated entry. In the event that there are no free entries in the cache 110, the cache 110 evicts data from an entry to memory 104 and allocates the entry to the new data. Cache thrashing occurs in the event that there is too much contention for the cache, leading to too many misses occurring, with the result that data does not stay in the cache for very long, reducing the effectiveness of the cache as a means of reducing memory access latency.

Thus, techniques are provided herein for reducing cache thrashing by limiting which clients 212 are permitted to allocate into the cache 110 based on the operating conditions of the device 100. Again, allocating into the cache means, in response to a miss occurring, designating an entry of the cache 110 to store the data for the miss fetched from the memory 104. An allocation results in an eviction in the event that there are no free (e.g., invalid) entries in which to store the requested data. A client 212 that is not allowed to allocate into the cache 110 is, in some implementations or modes of operations, still permitted to access data in the cache in other ways, such as fetching data already stored in the cache, or modifying data already in the cache. However, such a client 212 does not cause new data to be brought into the cache 110 in the event of a miss.

The techniques for limiting which clients 212 are permitted to allocate include determining which clients 212 are permitted to allocate into the cache 110, and permitting or denying allocations for those clients 212 accordingly. In some implementations, the determination of which clients 212 are permitted to allocate is made in accordance with input from a workload monitor 204 and a cache controller 202 that performs set sampling. The workload monitor 204 is one or more of software, hardware (e.g., circuitry), or a combination thereof. In some examples, at least part of the workload monitor 204 is a part of a driver or operating system executing on the processor 102. In some examples, the workload monitor 204 is alternatively a hardware circuit or includes a hardware circuit. The cache controller 202 is similarly a hardware circuit, software entity, or combination thereof.

The workload monitor 204 monitors the workload being performed within the device 100. In some examples, each different workload is defined by which applications are executing on the processor 102 and/or which clients 212 are "active." A client 212 is active if the client is powered on and performing at least a threshold amount of work, where the threshold can be pre-defined and/or dynamically adjusted. In some examples, a first type of workload that is a gaming workload includes a game application executing on the processor 102 and a graphics processing unit (which is an auxiliary processor 114 and a client 212 of the LLC 110) is active. In another example, a second type of workload that is a video playback workload includes a video player software being executed in the processor 102 and a video decoder (which is an auxiliary processor 114 and a client 212 of the LLC 110) is active. In some example workloads, multiple different clients 212 are active and thus contend for the LLC 110.

The workload monitor 204 maintains permitted clients data 206 which indicates, for each of a plurality of workloads, which clients 212 to deny allocation of entries for in the LLC 212 while the device 100 is executing in that workload. For example, for a workload in which the processor 102 is executing a game, and clients 212 including a graphics processing unit and an audio hardware device are active, the permitted clients data 206 indicates that the graphics processing unit and the processor 102 are allowed to allocate into the LLC 110, but the audio hardware device is not allowed to allocate into the LLC 110. In another example, where audio playback software is executing on the processor 102 and the audio hardware device is active, and no game is executing, but the graphics processing unit is used intermittently (and thus active), the permitted clients data 206 indicates that the audio hardware is permitted to allocate into the LLC 110. Again, the permitted clients data 206 indicates, for each of a plurality of workloads, which of one or more clients 212 are permitted to allocate into the LLC 110. The permitted clients data 206 is, in various examples, stored in a memory specifically associated with the workload monitor 204 (e.g., within the workload monitor 204 in some implementations in which the workload monitor 204 is a hardware unit) or is stored in a different memory, such as in system memory 104 or a different memory.

The cache controller 202 performs set sampling within the cache 110. The cache controller 202 allows or disallows clients 212 based on the monitored workload and the set sampling. More specifically, the workload monitor 204 determines when a workload switch occurs. In response to the workload switch, the workload monitor 204 consults a set of data (the permitted clients data 206) that indicates which clients 212 are permitted to allocate into the cache 110 for the current workload. The workload monitor 204 then permits or denies allocations for the clients 212 accordingly. During any particular period in which the workload is not changing, the cache controller 202 performs set sampling to identify set of clients 212 that should be allowed to allocate and/or a set of clients 212 that should not be allowed to allocate.

In general, set sampling includes reserving a small portion of the cache 110 for testing different configurations and operating the cache 110 according to the configuration that tests in a manner that is considered optimal. As is generally known, set associative caches are divided into sets, each of which has one or more ways. Set sampling involves using a small portion of theses sets ("test sets") to test different allocation techniques, and, periodically, adjusting the non-test sets (that is, the sets of the cache 110 other than the test sets) to use the allocation technique deemed to be most optimal. The "allocation techniques" refer to which clients 212 are permitted and which clients are not permitted to allocate into the LLC 110. Set sampling provides the benefit of adjusting operation of the cache 110 to take into account current operating conditions, but sometimes suffers from delays in that it can take some time for the cache controller 202 to "recognize" that a particular allocation technique is more optimal than the technique currently being used in the non-testing test.

Figure 3:
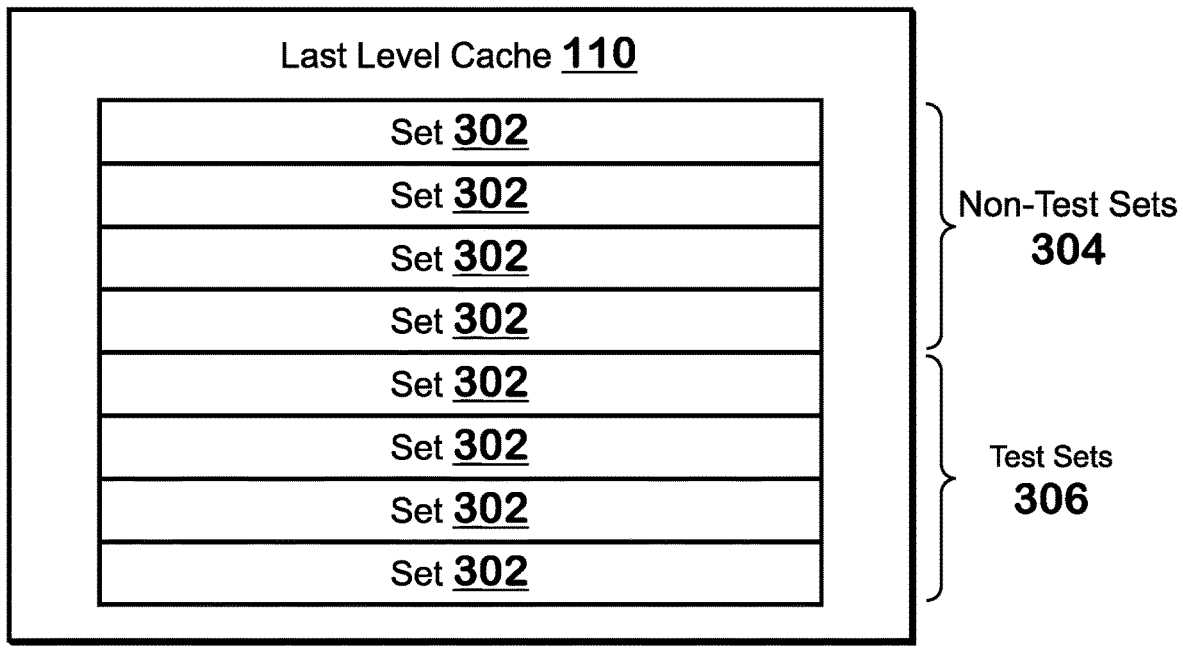
FIG. 3 illustrates a set sampling operation, according to an example.

FIG. 3 illustrates a set sampling operation, according to an example. The LLC 110 includes a plurality of non-test sets 304 and a plurality of test sets 306. The sets 302 are sets in a set-associative caching scheme. Such a scheme is one in which data that is to be placed into the cache (i.e., in response to a miss) is placed into one of the ways in a specific set based on the address of the data. In an example, for a miss at a cache line having an address, the cache fetches the cache line from the memory 104, and places that cache line into one of the ways in a set identified by some bits of that address.

For the non-test sets 304, the cache controller 202 operates those sets according to a current allocation permission policy. An allocation permission policy indicates which clients 212 are permitted allocations into the last level cache 110. For the test sets 306, the cache controller 202 operates those sets according to candidate allocation permissions policies. The cache controller 202 operates different test sets 306 according to different candidate allocation permissions policies. Based on the performance measured with each test set 306, the cache controller 202 selects an allocation permissions policy. In an example, the test set 306 selects the allocation permissions policy for the test set 306 that is deemed to exhibit the best performance. In an example, a test set 306 is deemed to exhibit the best performance in the event that the test set the test set experiences the smallest percentage of misses out of all test sets 306, or the highest percentage of hits out of all test sets 306. The percentage of misses means the percentage of misses to total number of accesses in a given amount of time and the percentage of hits means the percentage of hits to total number of accesses. In some examples, the cache controller 202 accumulates the hit percentage or miss percentage over time and, after a period of time has elapsed, selects a new allocation permissions policy with which to operate the last level cache 110. The cache controller 202 then operates the last level cache 110 according to that policy. Operating according to an allocation permissions policy means disallowing allocations for clients 212 as specified by the allocation permissions policy.

Figure 4:
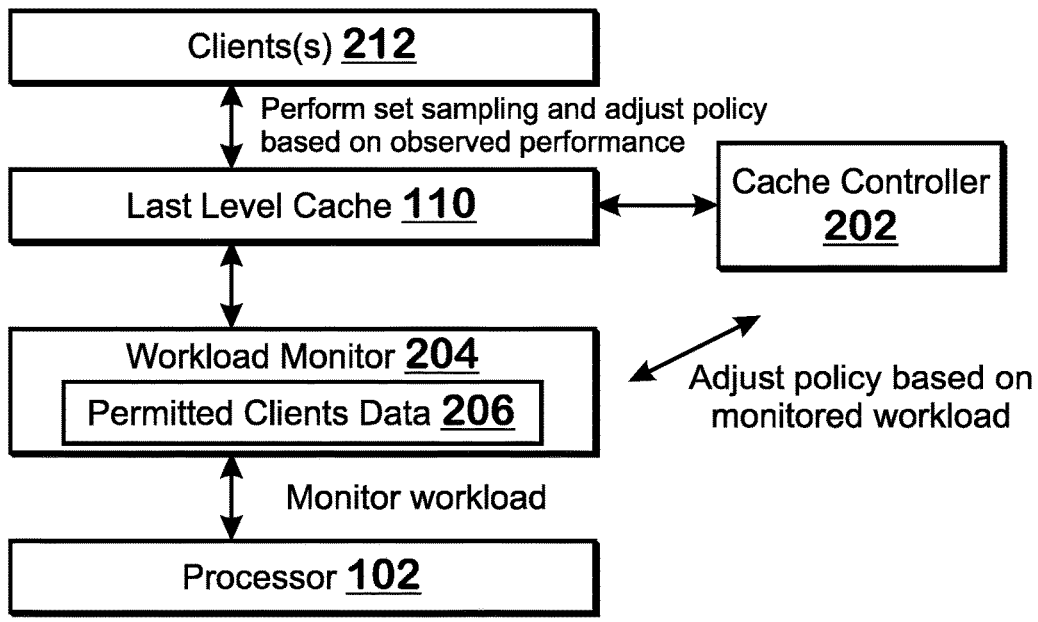
FIG. 4 illustrates operation of the system, according to an example.

FIG. 4 illustrates operation of the system 100, according to an example. The last level cache 110 operates according to a current allocation permissions policy at any given point in time. As described above, an allocation permissions policy indicates which clients 212 are allowed to allocate entries into the LLC 110. Operating according to a current allocation permissions policy means permitting or denying allocations to clients 212 according to the current allocation permission policy.

The cache controller 202 performs set sampling for test sets of the LLC 110. The cache controller 202 configures different test sets to operate different allocation permissions policies. The cache controller 202 measures the performance of the test sets over time. At various times, the cache controller 202 selects the best performing test set and applies the allocation permissions policy of that test set to the non-test sets.

It is possible for set sampling alone to inaccurately account for operating aspects of the device 100. For example, when the workload switches on the device 100, the newly active clients 212 and/or newly executing software may utilize the cache 110 in a different manner than prior to that switch. However, the set sampling alone may not immediately or quickly capture that new manner of utilization. Thus the workload monitor 204 controls the allocation permissions policy in the LLC 110 according to the monitored workload and the permitted clients data 206. The workload monitor 204 and cache controller 202 thus operate together to select an allocation permissions policy with which to operate the LLC 110. When the workload monitor 204 detects a workload change that would result in a different allocation permissions policy, the workload monitor 204 causes the cache controller 202 to operate the LLC 110 based on that allocation permissions policy. When the cache controller 202 determines, based on set sampling, that the LLC 110 should operate according to a new allocation permissions policy, the cache controller 202 causes the LLC 110 to operate according to that new permission policy.

Figure 5:
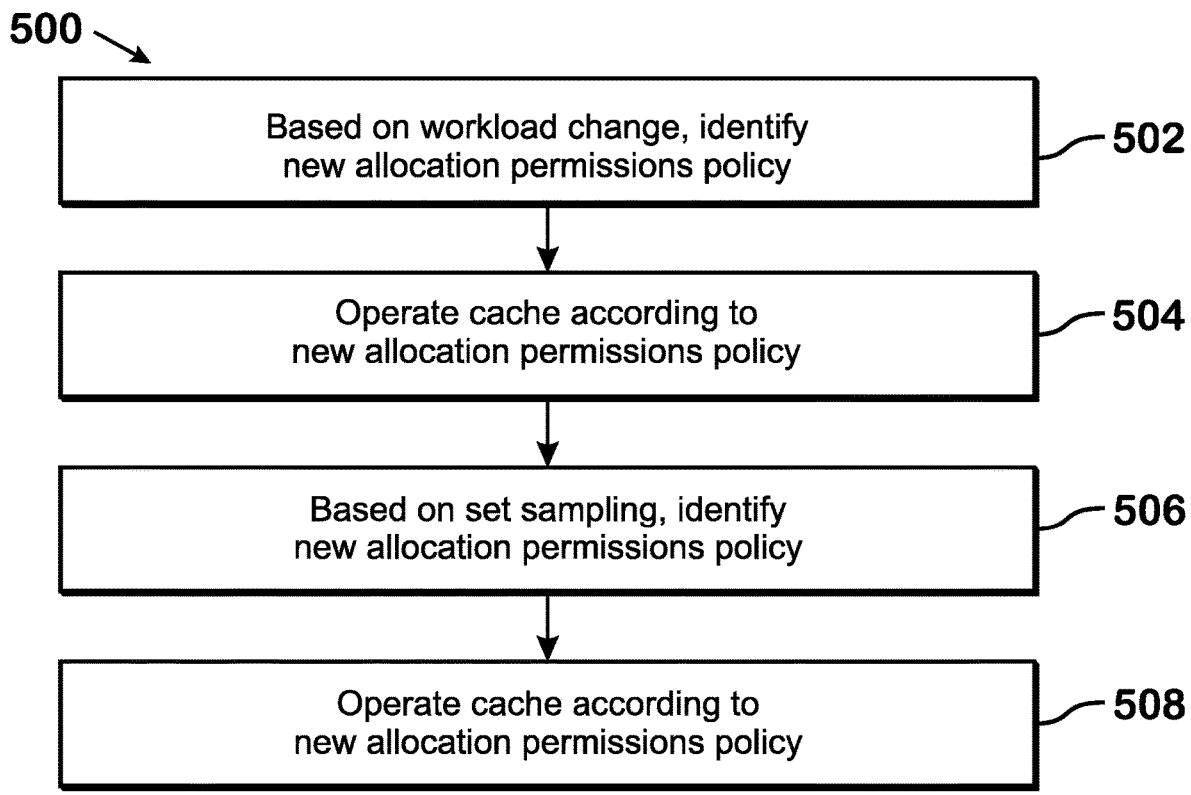
FIG. 5 is a flow diagram of a method for operating a cache, according to an example.

FIG. 5 is a flow diagram of a method 500 for operating a cache, according to an example. Although described with respect to the system of FIGS. 1-4, those of skill in the art will recognize that any system configured to perform the steps of the method 500 in any technically feasible order falls within the scope of the present disclosure.

At step 502, a workload monitor 204, which is configured to monitor for a workload change, identifies a workload change. Based on this workload change, the workload monitor 204 identifies a new allocation permission policy. In some examples, the workload monitor 204 accesses permitted clients data 206 to identify the allocation policy associated with the new workload. In some examples the permitted clients data 206 includes an entry for each of a set of different workloads. Each entry indicates, for a particular workload, what allocation permission policy to use. In some examples, the workload monitor 204 communicates with hardware and/or software (e.g., the operating system or a driver) to determine the current workload. At step 504, in response to the workload changing, the workload monitor 204 causes the allocation permissions policy to change based on the new allocation permissions policy.

At step 506, the cache controller 202 identifies a new allocation permissions policy based on set sampling. In various examples, this identification occurs at various timing intervals, such as irregular or regular timing intervals. In each timing interval, the cache controller 202 collects testing data that indicates the performance of a given allocation permissions policy in several test sets 306 and identifies an allocation permissions policy of the test set that is deemed to perform most optimally. In some examples, the test set 306 with the highest hit rate (e.g., percentage of hits to overall memory access requests) or the lowest miss rate (e.g., percentage of misses to overall memory access requests) is deemed to perform most optimally. At step 508, the cache controller 202 causes the LLC 110 to operate according to the selected allocation permissions policy.

It should be understood that the ordering of the steps of FIG. 5 could be reversed or rearranged in any manner. In general, the method 500 changes the current allocation permissions policy in response to a new workload occurring, because the new workload serves to identify what an appropriate allocation permissions policy should be. Then, because the actual operating conditions may dictate that a different allocation permissions policy is needed, based on set sampling, the cache controller 202 monitors the actual cache performance using set sampling in order to change the allocation permissions policy if needed. Changing the allocation permissions policy in response to both the actual performance and the workload monitoring allows the cache operation to be flexible and responsive to changing operating conditions.

The elements in the figures are embodied as, where appropriate, software executing on a processor, a fixed-function processor, a programmable processor, or a combination thereof. The processor 102, last level cache 110, interconnect 112, memory 104, storage 108, various auxiliary devices 106, clients 212, cache controller 202, and workload monitor 204 include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a cache for a device, the method comprising:
    based on a workload change, identifying a first allocation permissions policy, the workload change comprising a change from a first workload to a second workload, the first workload comprising one or more executing applications and one or more active clients and the second workload comprising one or more executing applications and one or more active clients;
    operating the cache according to the first allocation permissions policy, wherein the first allocation permissions policy indicates which clients of a set of clients are permitted to allocate into the cache, wherein the allocating includes, in response to a miss for a request, assigning an entry of the cache to store data for the request;
    based on set sampling, identifying a second allocation permissions policy; and operating the cache according to the second allocation permissions policy.

2. The method of claim 1, wherein the workload change includes the device changing from operating according to a first workload to operating according to a second workload.

3. The method of claim 2, wherein the first workload includes a first combination of clients being active and software executing on the device; and the second workload includes a second combination of clients being active and software executing on the device.

4. The method of claim 1, wherein identifying the first allocation permissions policy includes identifying the first allocation permissions policy based on a currently active workload, by referring to a set of permitted clients data.

5. The method of claim 1, wherein the set sampling includes operating different test sets of the cache according to different allocation permissions policy.

6. The method of claim 5, wherein identifying the second allocation permissions policy includes selecting an allocation permissions policy for which performance deemed to be optimal is observed.

7. The method of claim 5, wherein the different test sets include sets of the cache in a set associativity scheme.

8. The method of claim 1, wherein the first allocation permissions policy indicates which clients are permitted and which clients are not permitted to allocate entries in the cache.

9. The method of claim 1, wherein the cache is a last level cache.

10. A system, comprising:
    a cache; and
    a cache controller, configured to:
        based on a workload change, identify a first allocation permissions policy, the workload change comprising a change from a first workload to a second workload, the first workload comprising one or more executing applications and one or more active clients and the second workload comprising one or more executing applications and one or more active clients;
        operate the cache according to the first allocation permissions policy, wherein the first allocation permissions policy indicates which clients of a set of clients are permitted to allocate into the cache, wherein the allocating includes, in response to a miss for a request, assigning an entry of the cache to store data for the request;
        based on set sampling, identifying a second allocation permissions policy; and
        operate the cache according to the second allocation permissions policy.

11. The system of claim 10, wherein the workload change includes a device changing from operating according to a first workload to operating according to a second workload.

12. The system of claim 11, wherein the first workload includes a first combination of clients being active and software executing on the device; and the second workload includes a second combination of clients being active and software executing on the device.

13. The system of claim 10, wherein identifying the first allocation permissions policy includes identifying the first allocation permissions policy based on a currently active workload, by referring to a set of permitted clients data.

14. The system of claim 10, wherein the set sampling includes operating different test sets of the cache according to different allocation permissions policy.

15. The system of claim 14, wherein identifying the second allocation permissions policy includes selecting an allocation permissions policy for which performance deemed to be optimal is observed.

16. The system of claim 14, wherein the different test sets include sets of the cache in a set associativity scheme.

17. The system of claim 10, wherein the first allocation permissions policy indicates which clients are permitted and which clients are not permitted to allocate entries in the cache.

18. The system of claim 10, wherein the cache is a last level cache.

19. A system, comprising:
a processor;
a cache configured to service requests of the processor; and
a cache controller, configured to:
- based on a workload change, identify a first allocation permissions policy, the workload change comprising a change from a first workload to a second workload, the first workload comprising one or more executing applications and one or more active clients and the second workload comprising one or more executing applications and one or more active clients;
- operate the cache according to the first allocation permissions policy, wherein the first allocation permissions policy indicates which clients of a set of clients are permitted to allocate into the cache, wherein the allocating includes, in response to a miss for a request, assigning an entry of the cache to store data for the request;
- based on set sampling, identifying a second allocation permissions policy; and
- operate the cache according to the second allocation permissions policy.

20. The system of claim 19, wherein the workload change includes a device changing from operating according to a first workload to operating according to a second workload.

* * * * *